United States Patent Office 3,409,672
Patented Nov. 5, 1968

3,409,672
1-PHENYL-2-DIALKYLAMINOALKYL-1,3-PROPANEDIOLS
Donald L. Trepanier, Indianapolis, Ind., assignor to The Dow Chemical Company, Midland, Mich., a corporation of Delaware
No Drawing. Filed Sept. 28, 1966, Ser. No. 582,542
5 Claims. (Cl. 260—570.6)

ABSTRACT OF THE DISCLOSURE 1-phenyl - 2-(dialkylaminoalkyl)-1,3-propanediols are prepared by the hydrolysis and hydrogenation of α-benzoyl-ω-dialkylamino acid esters with lithium aluminum hydride. The compounds are useful as potentiators of epinephrine, spasmogen-blocking agents, sedatives and pesticides.

---

This invention is concerned with novel 1-phenyl-2-(dialkylaminoalkyl)-1,3-propanediols and is particularly directed to compounds corresponding to the formula:

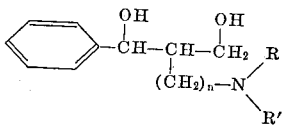

In the present specification and claims, R and R' represent methyl, ethyl, propyl and butyl and n is an integer from 2, to 3, to 4. The compounds of the present invention are white solids and clear viscous oils which are moderately soluble in water and soluble in a variety of organic solvents, such as acetone, benzene, methanol and chloroform.

The novel compounds have been found useful as potentiators of epinephrine, and have also been found useful as spasmogen-blocking agents and sedatives. The compounds are also useful as pesticides for the control of such representative organisms as helminths, insects and arachnids.

The novel compounds are prepared by the hydrolysis and hydrogenation of an α-benzoyl-ω-dialkylamino acid ester corresponding to the formula

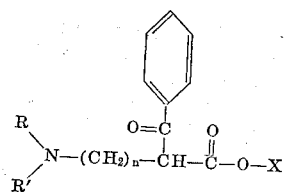

wherein X represents methyl, ethyl, propyl or butyl. The reaction is carried out by contacting the desired ester with a hydrogen donor such as lithium aluminum hydride. In a convenient procedure, the hydrogen donor is suspended in an anhydrous inert reaction medium such as tetrahydrofuran or dry ether. The substituted ester is then mixed with the suspension. The reaction proceeds readily at temperatures from 30° to 100° C., preferably at the boiling temperature of the reaction mixture. The proportions of the reactants to be employed may be varied so long as at least one mole of lithium aluminum hydride is employed for every mole of ester. However, the reaction consumes two moles of lithium aluminum hydride for every mole of ester, and the use of the reactants in such proportions is preferred.

In preparing the substituted 1,3-propanediols of the present invention, the hydrogen donor, preferably lithium aluminum hydride, is suspended in dry ether and an ether solution of an appropriate ester is added. The mixture is then heated to within the desired temperature range. After the heating period, water is added to the reaction mixture to decompose any unreacted hydride and the resulting mixture filtered. The desired substituted propanediol product can be isolated from the filtered reaction mixture by such conventional techniques as evaporation and distillation. The product may be further purified by conventional procedures such as recrystallization and distillation.

The following examples illustrate the present invention but are not to be construed as limiting the same.

Example 1

Ethyl 2-benzoyl - 4-(diethylamino)-butyrate (100 grams; 0.344 mole) in dry ether solution was added dropwise to a suspension of lithium aluminum hydride (26.2 grams; 0.691 mole) in dry ether. The mixture, containing about 650 milliliters of ether, was heated to reflux for 20 hours with stirring. 52 milliliters of water were added to decompose excess hydride, after which the white mixture was cooled and filtered. The filter cake was washed with 225 milliliters of isopropanol and then discarded. The combined washings and filtrate were distilled under reduced pressure to leave a clear yellow oil as a residue. The latter oil was distilled and a 40 gram fraction collected at 157°–167° C. under a pressure of 0.50 millimeter of mercury. This 1-phenyl - 2-(diethylaminoethyl) - 1,3-propanediol fraction was also a clear yellow oil.

In substantially the same procedure, 1-phenyl-2-(dibutylaminoethyl)-1,3-propanediol, having a molecular weight of 347, is prepared by contacting one molar proportion of ethyl 2-benzoyl - 4-(dibutylamino)-butyrate with two molar proportions of lithium aluminum hydride in dry ether.

Example 2

Ethyl 2-benzoyl - 4-(dimethylamino) - butyrate (110 grams; 0.418 mole) was dissolved in dry ether and added dropwise to an ethereal suspension of lithium aluminum hydride (32 grams; 0.843 mole). The reaction mixture, containing about 600 milliliters of ether, was refluxed for 20 hours with stirring during which time the reaction mixture became white. 64 milliliters of water were added and the mixture was cooled and filtered. The filter cake was washed with 225 milliliters of isopropanol and the combined washings and filtrate were distilled under reduced pressure to yield a colorless oil as a residue. The oil was distilled in vacuo and the product fraction collected at 130°–140° C. under 0.15 millimeter of mercury pressure. On cooling, the viscous oily product became a white solid with an amine-like odor. The white solid was recrystallized three times from a mixture of benzene and hexane to yield the 1-phenyl-2-(dimethylaminoethyl)-1,3-propanediol product. The product was found to melt at 101°–103° C. and, by analysis, to have carbon, hydrogen and nitrogen contents of 70.05, 9.47 and 6.07 percent, respectively, as compared with the theoretical contents of 69.92, 9.48 and 6.27 percent, respectively, calculated for the named structure.

An ether solution of ethyl 2 - benzoyl - 5 - (diethylamino) - pentanoate (100 grams; 0.338 mole) was added dropwise to a suspension of lithium aluminum hydride (25 grams; 0.658 mole) in dry ether. The reaction mixture, containing about 600 milliliters of ether, was refluxed and stirred for 20 hours. 50 milliliters of water were added, the mixture was cooled, filtered and the filter cake washed with 225 milliliters of isopropanol. The combined washings and filtrate were distilled at reduced pressure, after which the residual oil was distilled in vacuo. A fraction was collected at 160°–185° C. under 0.5–0.6 millimeter of mercury pressure and redistilled. The product fraction was collected from the redistillation at 171°–174° C. under 0.10–0.15 millimeter of mercury pressure. This 1 - phenyl - 2 - (diethylaminopropyl) - 1,3-propanediol product was a colorless viscous oil and was found by analysis to have carbon and hydrogen contents of 71.88 and 10.43 percent, respectively, as compared with the theoretical contents of 72.40 and 10.02 percent, respectively, calculated for the named propanediol.

In substantially the same procedure, the following substituted propanediols are produced:

1 - phenyl - 2 - (dimethylaminobutyl) - 1,3 - propanediol, having a molecular weight of 291, by contacting one molar proportion of ethyl 2 - benzoyl - 6 - (dimethylamino) - hexanoate with two molar proportions of lithium aluminum hydride in dry ether;

1 - phenyl - 2 - (diethylaminobutyl) - 1,3 - propanediol, having a molecular weight of 319, by contacting one molar proportion of ethyl 2 - benzoyl - 6 - (diethylamino) - hexanoate with two molar proportions of lithium aluminum hydride in dry ether;

1 - phenyl - 2 - (dipropylaminobutyl) - 1,3 - propanediol, having a molecular weight of 347, by contacting one molar proportion of ethyl 2 - benzoyl - 6 - (dipropylamino) - hexanoate with two molar proportions of lithium aluminum hydride in dry ether;

1 - phenyl - 2 - (dibutylaminobutyl) - 1,3 - propanediol, having a molecular weight of 375, by contacting one molar proportion of ethyl 2 - benzoyl - 6 - (dibutylamino) - hexanoate with two molar proportions of lithium aluminum hydride in dry ether; and 1 - phenyl - 2 - (dibutylaminopropyl) - 1,3 - propanediol, having a molecular weight of 361, by contacting one molar proportion of ethyl 2 - benzoyl - 5 - (dibutylamino) - pentanoate with two molar proportions of lithium aluminum hydride in dry ether.

EXAMPLE 4

An ethereal solution of ethyl 2 - benzoyl - 5 - (dimethylamino) - pentanoate (100 grams; 0.36 mole) was added dropwise to an ethereal suspension of lithium aluminum hydride (27.4 grams; 0.72 mole) and the mixture was refluxed for 20 hours with stirring. 54.8 milliliters of water were added and the mixture was cooled and filtered to remove the white suspended solids. The filter cake was washed with 225 milliliters of isopropanol and the combined washings and filtrate were distilled at reduced pressure. The colorless oily residue was distilled and a fraction collected at 165°–170° C. under a pressure of 0.06 millimeter of mercury. This fraction was redistilled and the product fraction collected at 175°–184° C. under a pressure of 0.5 millimeter of mercury. This fraction, the 1 - phenyl - 2 - (dimethylaminopropyl) - 1,3 - propanediol product, was a colorless viscous oil. The structure was confirmed by infrared spectroscopy.

EXAMPLE 5

Ethyl 2 - benzoyl - 4 - (diisopropylamino) - butyrate (100 grams; 0.314 mole) in ether solution was added dropwise with stirring to a suspension of lithium aluminum hydride (24 grams; 0.632 mole) in dry ether. The mixture, containing about 700 milliliters of ether, was refluxed for 20 hours, after which 48 milliliters of water were added. The cooled mixture was filtered, the filter cake washed with three 75-milliliter portions of isopropanol and the combined filtrate and washings evaporated at reduced pressure to yield a viscous yellow oil. The oil was treated with ethanol and hexane, ethanol and ether, isopropyl alcohol and ether, isopropyl alcohol and hexane and benzene and hexane, but did not form a solid. The oil was redistilled and the product collected as a clear viscous fraction at 171°–173° C. under a pressure of 0.075–0.10 millimeter of mercury. The structure of the 1 - phenyl - 2 - (diisopropylaminoethyl) - 1,3 - propanediol product was confirmed by infrared spectroscopy.

The novel propanediols are useful as potentiators of epinephrine. In representative operations, anesthetized dogs were examined to compare the effects of the propanediols on blood pressure response to epinephrine. The epinephrine was administered intravenously at dosage rates from 1 to 2 micrograms per kilogram. The test compounds were administered at dosage rates from 5 to 10 milligrams per kilogram by intravenous injection. Each of the compounds, 1 - phenyl - 2 - (dimethylaminoethyl) - 1,3 - propanediol, 1 - phenyl - 2 - (diethylaminoethyl) - 1,3 - propanediol and 1 - phenyl - 2 - (dimethylaminopropyl) - 1,3 - propanediol, were found to give increases of about 50 percent in blood pressure responsive to epinephrine.

In other operations, mice pretreated with 100 milligrams per kilogram of 1 - phenyl - 2 - (diisopropylaminoethyl) - 1,3 - propanediol by intraperitoneal injection were found to sleep twice as long following intraperitoneal injections of 100 milligrams per kilogram of hexobarbital as mice which were not pretreated with a propanediol compound.

In representative pesticidal operations, a one percent solution (weight/volume mixture with acetone) containing 1 - phenyl - 2 - (dimethylaminoethyl) - 1,3 - propanediol as the sole toxicant therein was found to give good kills and controls of nymphs of the Lone Star tick (*Amblyomma americanum*) contacted with the toxicant composition. In other operations, good kills and controls of the two-spotted spider mite (*Tetranychus bimaculatus*) were obtained when compositions containing 1 - phenyl - 2 - (diisopropylaminoethyl) - 1,3 - propanediol, as the sole toxicant therein and in an amount sufficient to provide a toxicant concentration of 500 parts per million by weight, were applied to the leaves of mite-infested plants.

The α - benzoyl - ω - dialkylamino acid esters employed as starting materials herein are disclosed and claimed in my copending application, Serial No. 582,515, filed concurrently herewith.

I claim:
1. The substituted 1,3 - propanediol compounds corresponding to the formula

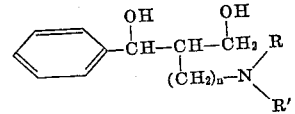

wherein R and R' each represent a member of the group consisting of methyl, ethyl, propyl and butyl and *n* represents an integer from 2, to 3, to 4.

2. The compound claimed in claim 1 wherein the compound is 1 - phenyl - 2 - (dimethylaminoethyl) - 1,3-propanediol.

3. The compound claimed in claim 1 wherein the compound is 1 - phenyl - 2 - (diethylaminoethyl) - 1,3 - propanediol.

4. The compound claimed in claim 1 wherein the compound is 1 - phenyl - 2 - (diisopropylaminoethyl) - 1,3-propanediol.

5. The compound claimed in claim 1 wherein the compound is 1 - phenyl - 2 - (dimethylaminopropyl) - 1,3-propanediol.

References Cited

UNITED STATES PATENTS 2,103,266   12/1937   Lotti _____ 260—103

CHARLES B. PARKER, *Primary Examiner.*

ROBERT V. HINES, *Assistant Examiner.*